Oct. 30, 1934.  C. L. KENNEDY  1,979,160
CONDENSER INDUCTION MOTOR
Original Filed Jan. 5, 1929
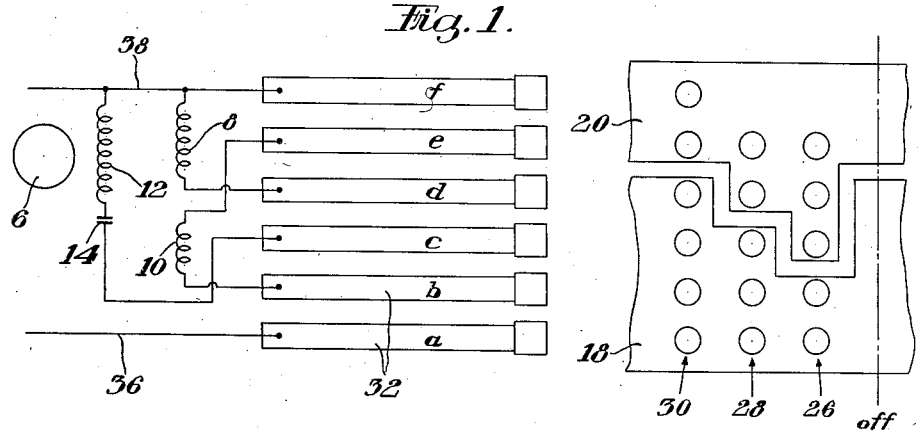
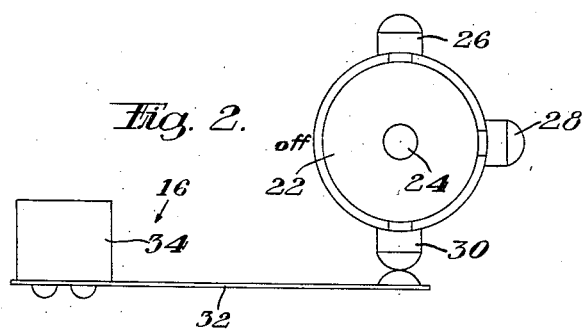
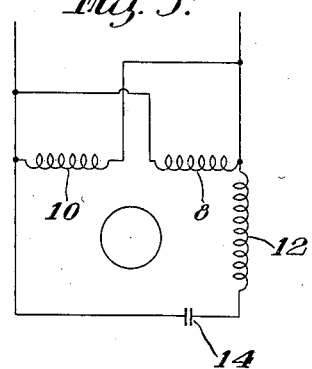
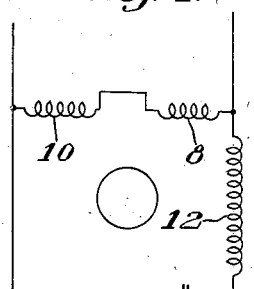
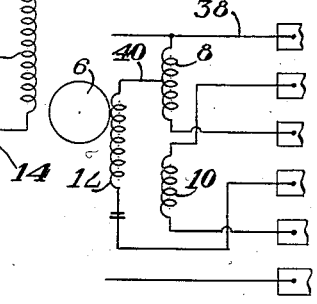
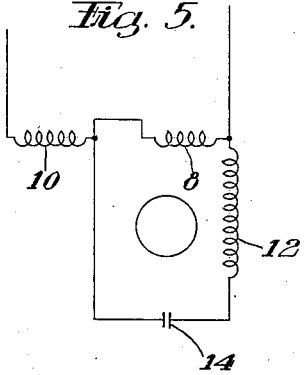
Witness
George O. Rigby.
Inventor
Carlton L. Kennedy
by Van Everen Fish
Hildreth & Cary
Attys.

Patented Oct. 30, 1934

1,979,160

UNITED STATES PATENT OFFICE 1,979,160

CONDENSER INDUCTION MOTOR

Carlton L. Kennedy, Braintree, Mass., assignor to The Holtzer-Cabot Electric Company, Roxbury, Mass., a corporation of Massachusetts Application January 5, 1929, Serial No. 330,499
Renewed December 18, 1933

3 Claims. (Cl. 172—233)

The present invention relates to condenser induction motors.

One object of the present invention is to provide a simple and inexpensive condenser induction motor having provision for operation at a plurality of speeds.

Another object of the present invention is to provide a condenser induction motor which may be connected for operation at any one of a plurality of line voltages.

With these objects in view, the present invention consists in the induction motor hereinafter described and particularly defined in the claims.

In the accompanying drawing, Fig. 1 is a diagram of a condenser induction motor, together with switching means to permit operation at three speeds; Fig. 2 is an end view of the switch; Fig. 3 is a diagram of the motor when connected for high speed operation; Fig. 4 is a diagram of the motor as connected for an intermediate speed; Fig. 5 is a diagram of the motor as connected for low speed; and Fig. 6 is a fragmentary diagram similar to Fig. 1, showing a modified connection of the condenser circuit.

The illustrated embodiment of the invention comprises a condenser induction motor having a rotor 6, a pair of similar main or line windings 8 and 10, and a condenser circuit including a condenser winding 12 and a condenser 14 in series therewith. The windings 8, 10 and 12 are wound on the stator of the motor, the line windings being disposed as in the usual single phase motor. The condenser winding 12 is displaced in space phase from the windings 8 and 10, the amount of the displacement preferably approximating 90 electrical degrees in order that currents in the main and condenser windings may set up magnetic fields in space quadrature, thereby producing a rotating magnetic field. The rotor 6 may be of any type but for simplicity is preferably of the squirrel cage type. One end of the condenser winding 12 is permanently connected to the line winding 8 and these two windings are adapted to be connected together to one side of the line.

The various windings are adapted to be connected in three different ways for high, intermediate, and low speeds. The high speed connection is shown in Fig. 3 in which the working windings 8 and 10 are connected in parallel and the condenser circuit is connected in parallel with the line windings. For intermediate speed, as shown in Fig. 4, the line windings 8 and 10 are connected in series, the condenser circuit being unchanged from that shown in Fig. 3 and therefore connected across both of the line windings. The low speed connection is shown in Fig. 5 in which the line windings 8 and 10 are connected in series as for the intermediate speed but the condenser circuit is connected across one only of the line windings. In Fig. 5, the lead wire from the condenser 14 is connected to the junction between the windings 8 and 10.

In order to facilitate change of speed, a switch indicated generally at 16 is provided. The switch comprises two drums 18 and 20 of conducting material which are shown in developed form in Fig. 1. The drums are secured to an insulating cylinder 22 which is mounted on a shaft 24 to permit convenient rotation thereof. Each drum has three rows 26, 28 and 30 of contact buttons adapted for selective engagement with six spring contact strips 32 which are mounted on an insulating bar 34. In the "off" position, the contact springs 32 do not engage with any part of the drums. Upon turning of the cylinder through 90°, the contact springs are permitted to engage with the buttons of row 26 for low speed operation. Further rotation through 90° permits engagement of the contact springs with the buttons controlling the connections for intermediate speed and finally a further rotation of 90° permits the high speed connection on the buttons 30. As shown in Fig. 1, one line wire 36 is connected with the first contact spring $a$ and the other line wire 38 is connected with the sixth spring $f$. The line winding 8 is permanently connected with the line wire 38 and with the fourth contact spring $d$. The line winding 10 is connected to the second and the fifth contact springs $b$ and $e$, while the condenser circuit is connected at one end permanently to the line wire 38, and at the other end to the third contact spring $c$. It will be seen that upon turning the switch cylinder through its successive positions, the windings of the motor may be successively connected for low, intermediate, and high speed operations as shown respectively in Figs. 5, 4, and 3.

In operation, assuming the motor to be connected for high speed operation as shown in Fig. 3, the condenser circuit takes a current which leads the currents in the line windings 8 and 10 by virtue of the fact that the condenser 14 is of sufficiently small capacity or of sufficiently high reactance to prevent attainment of resonant conditions in the condenser circuit. The condenser winding 12 may have any number of turns. In order that the size of the condenser may be kept fairly small, it is in some cases desirable to construct the condenser winding 12 with a large number of turns but in this case the voltages on the condenser and the condenser winding may rise to such high values that special precautions to prevent the breakdown of insulation must be taken, and therefore it may be preferred to use a small condenser winding 12 and a fairly large condenser 14.

The speed at which a motor of the type described will operate depends upon the fluxes created by the currents in the main and condenser windings. For a load of given power, the speed will decrease as the flux decreases because the decreasing flux requires that the motor operate at a greater slip in order that the induced voltages may increase and thus permit the currents to rise to such values as to maintain the load. The connections shown in Figs. 4 and 5, therefore, will bring about such reductions of flux as to cause the motor to operate at a reduced speed in the first case and on a still lower speed in the second case.

Referring to Fig. 4 it will be seen that only one-half of the line voltage is applied to each of the line windings 8 and 10. The fluxes produced by currents in these windings will therefore decrease, thereby bringing about an increase of slip and a consequent reduction in speed. In this case, however, the condenser circuit is maintained across the line and if there were no interaction between the condenser winding and the line windings through the rotor, the condenser circuit would carry the same current and generate the same flux as at full speed. The interaction between the condenser and line windings through the rotor are in general of such a nature as to reduce the current in the condenser winding to some extent but for the purpose of a brief explanation it may be assumed that the flux conditions generated by the condenser winding are unchanged when the connections are changed from those shown in Fig. 3 to those shown in Fig. 4. The result is, therefore, that the flux generated by the two main windings 8 and 10 is approximately halved, while the flux generated by the condenser winding is not decreased in the same proportion. The conditions are therefore that the total flux is reduced somewhat below full speed running conditions and the motor therefore operates at a somewhat reduced speed. The motor then operates similarly to a slightly unbalanced two-phase motor.

The connections shown in Fig. 5 are similar to those of Fig. 4 except that the condenser circuit is connected across one only of the line windings. In this case, while the voltages across the separate line windings are approximately one-half of the full line voltage as in Fig. 4, the condenser circuit does not have full line voltage impressed upon it but only approximately one-half line voltage. The flux produced by the line windings will therefore be approximately halved with respect to the full speed condition, and also the flux produced by the condenser winding will be approximately halved. This results in a still further decrease in total flux and a consequent increase in slip.

The multi-speed induction motor as above described commends itself because of its simplicity and the fact that it requires no external apparatus with the exception of the switch. In fact, under conditions where speed changes are not frequently called for, the connections may be more or less permanently made and the switch itself eliminated. Moreover, it will be seen that all of the windings are active at all times and therefore the full space of the stator is availed of for reception of the windings. Since the speed control is effected without the use of external resistances, there is no external loss of power at reduced speeds and the motor therefore operates with a high overall efficiency.

Although the invention has been described as embodied in a motor having only two line windings which may be connected in series or parallel, the invention is not limited to the use of two such windings but may employ any number, it being within the purview of the invention to employ parallel connected line windings for high speed and series connected line windings for lower speeds and also to employ a condenser winding which may be connected across all of the line windings or across a part only of them.

The modified connection shown in Fig. 6 is one which may be employed when it is not desired to impress full line voltage at any time on the condenser circuit. The rotor 6 and windings 8, 10 and 12 are as in Fig. 1 and the windings are similarly connected to the contacts of the switch. The end of the condenser winding 12, however, instead of being connected directly to the line is connected to the mid-point of the line winding 8 by a lead 40. When the switch is in high speed position, the windings 8 and 10 are in parallel, the condenser circuit being connected across only one-half of the winding 8 and therefore having only approximately one-half line voltage impressed on it. For intermediate speed, the line windings are connected in series, the condenser circuit being now across one-half of the winding 8 and all of winding 10 so that it is subjected to a voltage which is approximately three-fourths of the line voltage. The voltage on each main winding is approximately halved, and this reduction of voltage operates to run the motor at a slower speed. However, the increase of voltage on the condenser circuit partially compensates for the reduction of voltage across each line winding, so that the degree of reduction of speed will not be so great as in the previously described construction, wherein the condenser circuit has full line voltage across it for both high and intermediate speeds. For the low speed connection, the main windings are still connected in series, the condenser circuit being now connected across only one-half of the winding 8 so that it receives only about one-fourth of the line voltage.

The connection shown in Fig. 6 is particularly desirable for high voltage motors, or motors in which the condenser winding is designed with a large number of turns, because it results in a lower voltage across the condenser. It will be understood that although the connection 40 has been shown as made to the mid-point of the winding 8, this showing is illustrative only, and the connection may, in fact, be made to any point of the winding intermediate to its ends.

The present invention also affords convenient means for permitting operation of an induction motor at one of several voltages. According to the present invention, the manufacturer may carry in stock a single type of motor which may be connected to operate at several different voltages with practically identical characteristics in each case. As described herein, the motor is particularly useful for operation at two different voltages, say 110 and 220 volts. For low voltage or 110 volt operation, the motor will be connected with the line windings and the condenser circuit all in parallel as shown in Fig. 3, and for high voltage, the motor will be connected with the line windings in series and with the condenser circuit across one of the line windings, as shown in Fig. 5. Thus for 110 volt operation, the motor in Fig. 3 has 110 volts impressed upon each of the line windings 8 and 10 and the same voltage is impressed upon the condenser circuit which includes the condenser winding 12 and the condenser 14. For 220 volt operation, the motor as connected in Fig. 5, also has approximately 110 volts impressed upon each of the line windings and therefore has about 110 volts on the condenser circuit. The speed and power characteristics of the motor for the two different voltages will therefore be practically identical.

Having thus described the invention, that is claimed is:

1. A multi-speed condenser induction motor having, in combination, a rotor, a stator having a plurality of similar main windings and a condenser winding displaced in space phase from the main windings, a condenser circuit including a condenser in series with the condenser winding, and switching means for connecting all of the main windings and the condenser circuit in parallel for high speed and for connecting the main windings in series with the condenser circuit across all of the main windings for intermediate speed and for connecting all of the main windings in series and the condenser circuit in parallel with less than all of the main windings for low speed.

2. The method of operating a condenser induction motor having main windings and a condenser circuit including a condenser winding and a condenser which consists in connecting the main windings and the condenser circuit all in parallel for high speed operation, connecting the main windings in series with each other and the condenser circuit in parallel with all the main windings for intermediate speeds, and connecting the main windings in series and the condenser circuit in parallel with a part only of the main winding for low speed operation.

3. A multi-speed condenser induction motor comprising a stator having two main windings and a condenser winding, the latter being displaced from the main windings, a condenser in series with the condenser winding and forming therewith a condenser circuit, a line lead connected to one end of one main winding and one end of the condenser circuit, another line lead connected to one end of the other main winding and the other end of the condenser circuit, and connections associated with the main windings for connecting said main windings either in parallel or in series between the line leads, for a high speed and a lower speed respectively, the condenser circuit remaining connected between the line leads.

CARLTON L. KENNEDY.